Sept. 1, 1959  J. L. REYNOLDS  2,902,396
LAMINATE FOR WRAPPING PRECOOKED FROZEN FOOD
Filed Aug. 28, 1956

INVENTOR
JULIAN L. REYNOLDS
BY Semmes & Semmes
ATTORNEYS

United States Patent Office 2,902,396
Patented Sept. 1, 1959

2,902,396

LAMINATE FOR WRAPPING PRECOOKED FROZEN FOOD

Julian L. Reynolds, Richmond, Va.

Application August 28, 1956, Serial No. 606,739

6 Claims. (Cl. 154—50)

The present invention relates to food processing and more particularly to the packaging of precooked foodstuffs in flexible containers to admit of temporary storage preliminary to reconstitution thereof for ultimate consumption. This application is a continuation-in-part of my copending application Serial No. 335,323 as filed on February 5, 1953, now abandoned.

Rapid developments in the quick freezing of fruits, vegetables and meats have made many seasonal foodstuffs available throughout the year and have reduced materially handling losses. The vegetable and animal products can be processed rapidly at the time of their maximum development of flavor, growth, color, yield and the like with a minimum loss in quality and food values. In many instances, however, the conventional packaging methods fail to meet the high standards necessary for adequate protection of the packaged foods during storage and handling, while the thawing and subsequent cooking of the frozen foods results in an unnecessary destruction of their alimentary values. Additionally, conventional packaging methods entail standardization of container sizes which frequently fail to meet consumer demands.

It is an object of the present invention to provide a method of packaging precooked foodstuffs in flexible containers adapted for intermediate storage pending reconstitution thereof for ultimate consumption.

A further object of my invention is to provide a packaged, precooked foodstuff which after being stored in frozen condition may be reconstituted for ultimate consumption while retained in the original package.

A still further object of the invention is the provision of a packaged, precooked foodstuff possessing dimensional stability and resistance to oxidation, dehydration and loss of flavor during prolonged periods of storage.

Other objects and advantages of my invention will be readily apparent from the following detailed description of certain preferred embodiments thereof when taken in conjunction with the accompanying drawing wherein.

Briefly stated the present invention contemplates the preparation of a food product to a stage adapted for consumption, encasing the cooked food in a metallic foil envelope provided with an integrated thermoplastic resinous lining, through which an hermetic seal is possible, quick freezing the sealed package of precooked food for temporary storage and subsequently reconstituting while retained in the sealed package the foodstuff for ultimate consumption.

Figure 1:
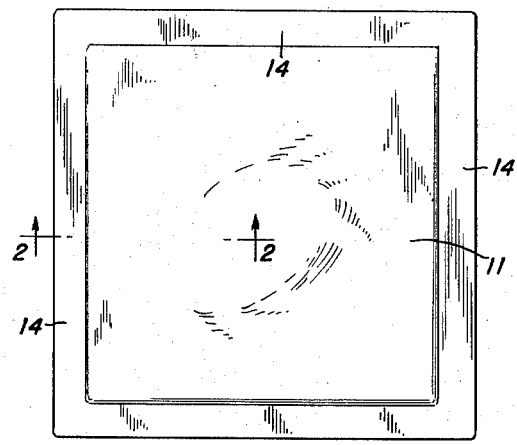
Figure 1 is a plan view of a packaged, precooked foodstuff prepared in accordance with my inventive concept.
Figure 2:
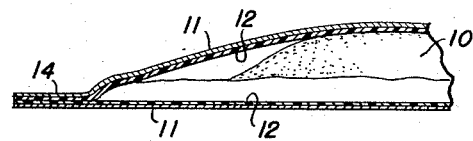
Figure 2 is a fragmentary sectional view thereof taken substantially along the line 2—2 of Figure 1.
Figure 2A:
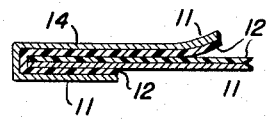
Figure 2a is a fragmentary sectional view on an enlarged scale of a modified form of packaged food.

Referring to the drawings in which by way of illustration the foodstuff to be processed consists of an egg 10 cooked by frying until the white is firm while the yolk remains unbroken and fluid, a product normally regarded as incapable of preservation, which is encased in an enveloping wrapper composed of sheets 11 of metallic foil provided with an integrated thermoplastic resinous lining 12 such as polyethylene through which an hermetic peripheral seal may be established as at 14. As best shown in Figure 2a, the edge seal of the wrapping envelope or package may be strengthened and made more resistant to moisture penetration by extending the upper sheet 11 over, around and under the lower sheet 11 providing in effect a double seal with a greatly increased path for moisture vapor transmission into the enclosed space within the envelope.

Figure 3:
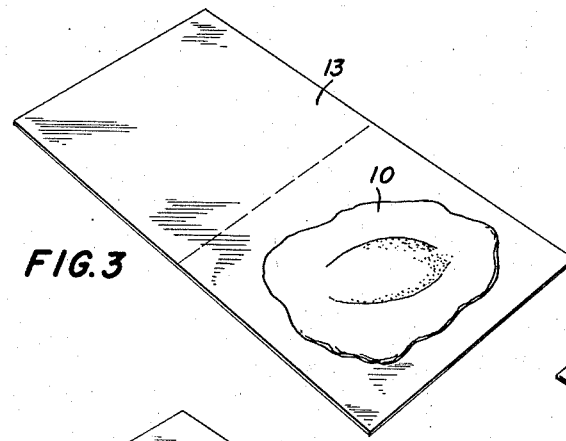
Figure 3 is a perspective view of a sheet of material from which a package for the cooked foodstuff placed thereon is to be formed.
Figure 4:
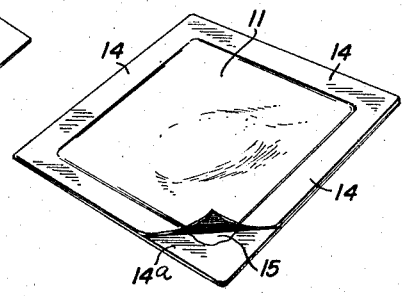
Figure 4 is a perspective view of the fabricated package enclosing the cooked foodstuff and hermetically sealed except for a corner evacuation post.

In another embodiment of the invention, illustrated in Figures 3 and 4 of the drawing, a strip 13 of metallic foil of sufficient length and width to encompass the particular foodstuff to be packaged, again in this instance the fried egg 10, and provided with an integrated thermoplastic resinous liner is folded upon itself and over the egg 10. The abutting edges of the foil strip are heat-sealed as at 14 through the medium of the thermoplastic resinous liner. If desired a corner vent 15, as shown in Figure 4, may be left unsealed for subsequent evacuation of the package after which the seal is completed by closing of the vent. This vent also provides an access port for the charging of the package with an inert gas where such atmosphere will assist in the preservation of the packaged foodstuffs. The air may be evacuated from the package by compressing the foil wrapper into intimate contact with the packaged foodstuff and thus reducing the enclosed air space.

Figure 5:
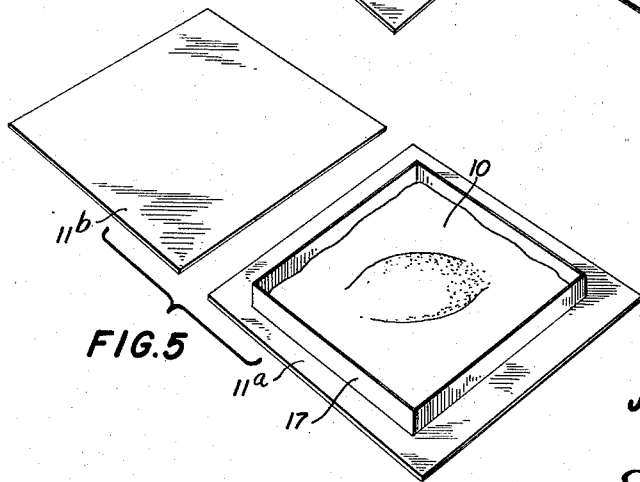
Figure 5 is a perspective view similar to Figure 3 except for the inclusion of a separate tray or receptacle for the cooked foodstuff to be packaged.

For uniformity of packaging of precooked foodstuffs which are not compact and solid and even the unitary products such as fried eggs, the use of an auxiliary tray or receptacle 17 as a temporary holder is contemplated. This filled tray 17 containing the cooked egg 10 may be enclosed by the aluminum foil strip as previously described or, as shown in Figure 5, the filled tray 17 may be placed in the center of a sheet 11a of metallic foil provided with its integrated thermoplastic resinous liner and covered with a complementary sheet 11b of foil wrapper material and the hermetic peripheral seal of the so-formed envelope completed.

The sealed package of foodstuff is subjected to reduced temperatures sufficiently low to induce quick freezing, the mechanics of this operation being so well-known as to eliminate the necessity for further elaboration here, and after freezing may be retained under refrigeration without physical or chemical deterioration until such time as they reach the public and are ready to be reconstituted for consumption.

To prepare the precooked foodstuffs for serving and consumption, the package, unopened, is placed in a suitable vessel filled with heated water or in a warming oven until by conduction and/or radiation the packaged material has attained that temperature best adapted for its consumption. The package is removed from its conditioning medium, opened and the contents removed for serving. Of course, if it is desired, and particularly when the auxiliary holding receptacle is present in the package, only the covering sheet of the envelope need be removed, the remainder providing a convenient serving dish.

It has been found that the reconstituted foodstuff will have the same characteristics of the original precooked material where, of course, the processing technique has been properly performed. Since the metallic foil wrapper is opaque to visible and ultraviolet light, the usual catalytic action of such rays accelerating rancidity in the oil and oxidative ingredients of the packaged foodstuffs is neutralized.

The metallic foil wrapper is preferably formed of aluminum in any convenient gauge of from 0.0002 inch in thickness up to 0.006 inch of any temper from full hard to the completely annealed dead soft. For ease of manipulation in the conventional packaging equipment, it has been determined that the commercially pure, dead soft aluminum foil 0.00035 of an inch in thickness is best adapted to the present invention.

The high conductivity of metallic wrapping materials greatly accelerates the rates of freezing, thawing and the final reheating of the packaged foodstuffs. At the same time, the metallic wrapping will serve as an insulating medium since it reflects approximately 95% of the radiant heat directed thereagainst.

The metallic foil wrapper will also create a package stability during storage and subsequent handling and since it is substantially impervious to moisture vapor and gas transmission, the packaged foodstuffs will be protected against chemical deterioration.

In order that the metallic foil wrapper may be hermetically sealed, it is provided with a continuous liner of a thermoplastic resinous material such as polyethylene, polyvinyl alcohol or polyvinyl chloride. The resinous material should be inserted with respect to the foodstuffs which are to be packaged both from the standpoint of attack by and effect on the food. There are available a variety of thermoplastic resins which can be extruded directly onto aluminum foil to form a composite sheeting. Such method of fabrication eliminates the need of solvents which frequently will provide a source of subsequent contamination. Although high temperature extrusion coating with polyethylene, for example, produces satisfactory adhesion between the resin and the base foil, it is also accompanied by a partial degradation of the resin occasioning a loss in physical strength and the creation of an objectionable odor therein. The foil surface may be treated with an adhesion promoter which will admit polyethylene extrusion coating at a temperature of approximately 500° F. eliminating deterioration of the resin per se while maintaining a satisfactory lamination with the base foil. An excellent adhesion promoter is tetraisopropyl stearyl titanate applied to the foil surface from a hexane solution containing from 1 to 5% by weight of the titanate. After the titanate film dries, it is hydrolyzed in situ and the polyethylene is extruded promptly on to the treated foil. Other adhesion promoters including shellac and various melamine resins have been used successfully.

A composite heat sealable sheeting even more resistant to delamination entails the interposition of a layer of paper between the base foil and the resin lining. The paper is of the so-called "wet strength" type signifying its impregnation with a small amount, from ½ to 1% by weight, of a melamine or phenol formaldehyde resin, cured in situ. The paper can be of any convenient weight and finish but for practical applications the weight is preferred to be between 15 and 35 pounds.

The paper interlayer is secured to the base foil through the medium of a continuous film of an adhesive which is substantially waterproof. A latex or vinyl base adhesive is entirely satisfactory as are those adhesives formulated around the thermo-setting resins of the polyamide, phenolic or acrylic types. The casein-latex adhesives have been employed satisfactorily. After the paper-foil laminate has been formed, the polyethylene or other resinous coating is extruded onto the paper surface and adheres tenaciously thereto, being interlocked with the paper fibers. The integrated multiple ply sheeting can be exposed over a wide temperature range and to diverse conditions of humidity without physical deterioration and contributes immeasurably to the successful realization of my inventive concept.

A wide variety of thermoplastic resins suitable for extrusion coatings are commercially available. Polyethylene is especially useful in the present invention since it is non-toxic, odorless and will withstand exposures to high and low temperatures without physical deterioration. The polyethylene should have a molecular weight of at least 13,000 in order that the film strength will be adequate in the final package, although with the reinforcement provided by the basic metallic foil the resin film strength is of little significance.

It will be readily apparent that my invention will enable the benefits of culinary skill and artistry to be enjoyed by the public generally since food products prepared under standardized conditions by experts can be packaged and frozen and require only a reheating for reconstitution into edible form. The packaged precooked foods are well adapted for general distribution through conventional retail outlets and the time lapse between packaging and reconstitution occasions no deterioration in the quality of the packaged materials. The improved packaging material also adapts itself to the conditions of reheating with an improved resistance to delamination and the danger of an accompanying package failure.

Manifestly other variations in the nature of the packaging materials, the foodstuffs undergoing processing and the methods of food handling are possible without departing from the spirit of the invention or the scope of the appended claims.

What I claim is:

1. An envelope suitable for containing pre-cooked quick-frozen food which is to be thermally reconstituted in the envelope, said envelope comprising an outer layer of aluminum foil, a liner of thermoplastic resin, and an interlayer of high wet strength paper impregnated with a small proportion of thermal setting resin and bonded between the foil layer and thermoplastic liner, said envelope being impermeable and resistant to delamination as a result of the action of water and grease.

2. A laminate suitable for use in wrapping quick frozen fried food, said laminate comprising a layer of aluminum foil on one side, a layer of thermoplastic resin on the other side, and an interlayer of high wet strength paper impregnated with a small percentage of thermal setting resin and bonded between the foil and thermoplastic layers, said laminate being impermeable and resistant to delamination as a result of the action of water and grease.

3. A flexible envelope for the reception and retention of pre-cooked food materials during refrigerated storage and handling and thermal reconstitution to the edible state, said envelope being formed of a heat sealable composite sheet of a metal foil of a thickness of from .0002–.006 inch, having a continuous liner of thermoplastic resinous material integrated with the inner face thereof through the medium of a layer of wet strength type paper, impregnated with a resinous material.

4. A flexible envelope for the reception and retention of pre-cooked food materials during refrigerated storage and handling and thermal reconstitution to the edible state, said envelope being formed of a heat sealable composite sheet of dead soft aluminum foil of a thickness of .00035 inch, having a continuous liner of thermoplastic resinous material integrated with the inner face thereof through the medium of a layer of wet strength type paper, impregnated with from ½ to 1% of a resinous material.

5. A laminate suitable for use in wrapping quick-frozen fried food, said laminate comprising a layer of aluminum foil on one side, a layer of thermoplastic resin on the other side, and an interlayer of high wet strength paper impregnated with from ½ to 1% by weight of a resin selected from the group consisting of melamine resin and phenol formaldehyde resin and bonded between the foil and thermoplastic layers, said laminate being impermeable and resistant to de-lamination as a result of the action of water and grease.

6. A laminate suitable for use in wrapping quick-frozen fried food, said laminate comprising a layer of aluminum foil on one side, a layer of thermoplastic resin on the other side, and an interlayer of high wet strength paper impregnated with a small percentage of thermosetting resin and bonded between the foil and thermoplastic layers, the surface of said foil being treated with an adhesion promoter, whereby said laminate is impermeable and resistant to de-lamination as a result of the action of water and grease.

References Cited in the file of this patent

UNITED STATES PATENTS

| | | |
|---|---|---|
| 2,364,049 | Bensel | Dec. 5, 1944 |
| 2,380,134 | Waters | July 10, 1945 |
| 2,551,087 | Barnhart et al. | May 1, 1951 |
| 2,609,301 | Lindsey | Sept. 2, 1952 |
| 2,621,129 | Ramsbottom et al. | Dec. 9, 1952 |
| 2,674,536 | Fisher | Apr. 6, 1954 |

FOREIGN PATENTS

| | | |
|---|---|---|
| 601,713 | Great Britain | May 11, 1948 |